United States Patent
Jang (10) Patent No.: US 11,901,802 B2
(45) Date of Patent: Feb. 13, 2024

(54) CONTROL CIRCUIT FOR A POWER SUPPLY AND POWER SUPPLY WITH REDUCED STANDBY POWER LOSSES

(71) Applicant: Infineon Technologies Austria AG, Villach (AT)

(72) Inventor: Sang Ho Jang, Gyeonggi-do (KR)

(73) Assignee: Infineon Technologies Austria AG, Villach (AT)

( * ) Notice: Subject to any disclaimer, the term of this patent is extended or adjusted under 35 U.S.C. 154(b) by 117 days.

(21) Appl. No.: 17/577,697

(22) Filed: Jan. 18, 2022

(65) Prior Publication Data
US 2022/0239216 A1 Jul. 28, 2022

(51) Int. Cl.
*H02M 1/00* (2006.01)
*H02M 3/335* (2006.01)

(52) U.S. Cl.
CPC ........ *H02M 1/0035* (2021.05); *H02M 1/0025* (2021.05); *H02M 3/33507* (2013.01)

(58) Field of Classification Search
CPC ............. H02M 1/0032; H02M 1/0035; H02M 3/33507
See application file for complete search history.

(56) References Cited

U.S. PATENT DOCUMENTS

| | | | | |
|---|---|---|---|---|
| 2009/0230934 A1* | 9/2009 | Hooijschuur | ........... | H02M 3/07 323/351 |
| 2011/0080144 A1* | 4/2011 | Hua | ...................... | H02J 7/0071 323/210 |
| 2015/0117069 A1* | 4/2015 | Kim | ..................... | H02M 3/3376 363/21.09 |
| 2015/0311806 A1* | 10/2015 | Kim | ..................... | H02J 7/00036 363/21.17 |
| 2015/0340948 A1* | 11/2015 | Postawka | ................ | H02M 1/36 323/282 |
| 2016/0094121 A1* | 3/2016 | Cowley | ................. | H02M 3/156 323/273 |
| 2017/0294830 A1 | 10/2017 | Ye et al. | | |
| 2022/0404896 A1* | 12/2022 | Escudero Rodriguez | | .................... G06F 1/3287 |
| 2022/0407405 A1* | 12/2022 | Escudero Rodriguez | | .................... H02M 3/1588 |

FOREIGN PATENT DOCUMENTS

| | | |
|---|---|---|
| CN | 110289756 A | 9/2019 |
| EP | 1178585 A2 | 2/2002 |
| JP | 2009278822 A | 11/2009 |
| WO | 2013048535 A1 | 4/2013 |

OTHER PUBLICATIONS

Officat action, EP 21 154 050.5, dated Jul. 20, 2022, pp. 1-4.
Extended Search Report, EP 21 15 4050, dated Jul. 2, 2021, pp. 1-7.
Office Action, Application No. 21 154 050.5, dated Jul. 28, 2023, pp. 1-4.

* cited by examiner

*Primary Examiner* — Fred E Finch, III
(74) *Attorney, Agent, or Firm* — Armis IP Law, LLC (57) ABSTRACT

A control circuit, a power supply including a control circuit, and a method are disclosed. The control circuit is configured to activate a second output capacitor connected in parallel with a first output capacitor of a power supply when the power supply is in a normal operating mode, and deactivate the second output capacitor when the power supply is in a standby mode.

24 Claims, 6 Drawing Sheets

CONTROL CIRCUIT FOR A POWER SUPPLY AND POWER SUPPLY WITH REDUCED STANDBY POWER LOSSES

RELATED APPLICATION

This application claims priority to earlier filed European Patent Application Serial Number EP21154050 entitled "CONTROL CIRCUIT FOR A POWER SUPPLY AND POWER SUPPLY WITH REDUCED STANDBY POWER LOSSES," filed on Jan. 28, 2021, the entire teachings of which are incorporated herein by this reference.

TECHNICAL FIELD

This disclosure relates in general to a power supply, in particular, a switched-mode power supply.

BACKGROUND

Switched mode power supplies are widely used in various kinds of applications. A switched mode power supply (SMPS) includes an input configured to receive an input power and an output configured to have a load connected thereto. The SMPS may operate in a normal operating mode when a load is connected to the output and provide a regulated output voltage to the load in the normal operating mode.

BRIEF DESCRIPTION

Before a load is connected to the SMPS or after the load has been disconnected, the SMPS may operate in a standby mode. In the standby mode, the input power is lower than in a normal operating mode, but is not zero. In the standby mode, the input power is mainly used to supply control circuitry of the SMPS. Supplying the control circuitry in the standby mode enables the SMPS to detect when a load is connected and to enter the normal operating as soon as the load has been connected.

It is desirable to reduce the power consumption of a switched mode power supply in the standby mode.

One example as described herein relates to a control circuit. The control circuit is configured to activate a second output capacitor connected in parallel with a first output capacitor of a power supply when the power supply is in a normal operating mode, and deactivate the second output capacitor when the power supply is in a standby mode.

Another example relates to a power supply. The power supply includes a converter stage having an input and an output, an output circuit connected to the output of the converter stage, and a control circuit. The output circuit includes a first output capacitor connected to the output of the converter stage, and a second output capacitor. The control circuit is configured to activate the second output capacitor when the power supply is in a normal operating mode, and deactivate the second output capacitor when the power supply is in a standby mode.

Another example relates to a method. The method includes operating a power supply in a normal operating mode or a standby mode, wherein operating the power supply in the standby mode includes activating a second output capacitor connected in parallel with a first output capacitor of the power supply, and wherein operating the power supply in the normal operating mode comprises deactivating the second output capacitor.

Examples are explained below with reference to the drawings. The drawings serve to illustrate certain principles, so that only aspects necessary for understanding these principles are illustrated. The drawings are not to scale. In the drawings the same reference characters denote like features.

In the following detailed description, reference is made to the accompanying drawings. The drawings form a part of the description and for the purpose of illustration show examples of how the invention may be used and implemented. It is to be understood that the features of the various embodiments described herein may be combined with each other, unless specifically noted otherwise.

DETAILED DESCRIPTION OF IMPLEMENTATIONS

Figure 1:
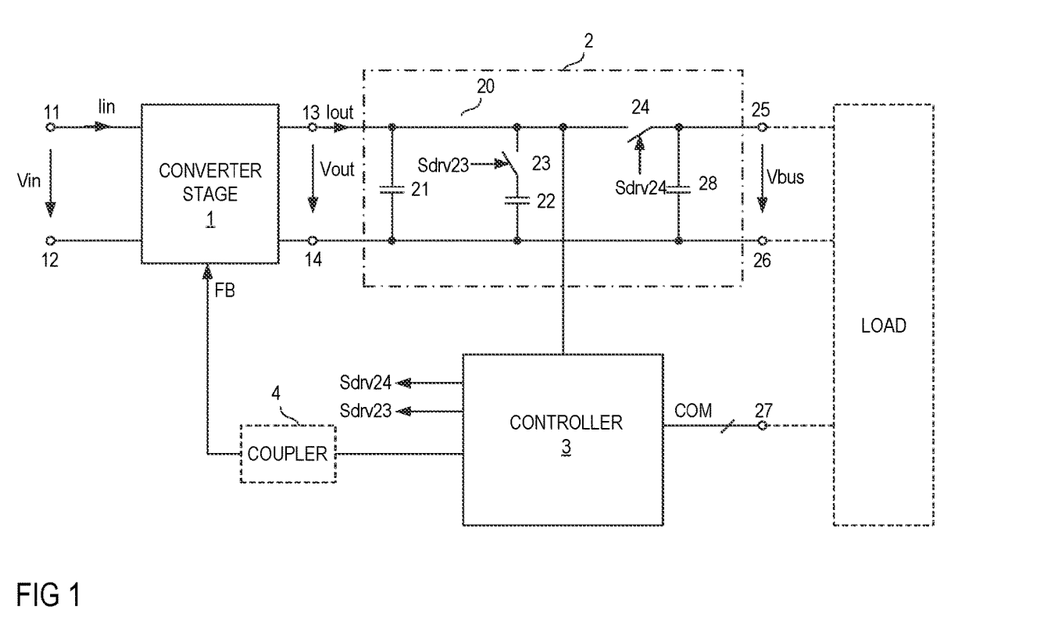
FIG. 1 shows a circuit diagram of the switched-mode power supply that includes a converter stage, an output circuit and a controller and that can be operated in a normal operating mode or a standby mode.

FIG. 1 shows a circuit diagram of a switched-mode power supply (SMPS) according to one example. The power supply includes a switched-mode converter stage 1 with an input 11, 12, configured to receive an input voltage Vin and an input current Iin and an output 13, 14, configured to provide an output voltage Vout and an output current Iout based on the input voltage Vin and the input current Iin. According to one example, the input voltage Vin is a direct voltage.

The power supply further includes an output circuit 2. The output circuit includes a first output capacitor 21 and a second output capacitor 22. The first output capacitor 21 is coupled to the output 13, 14, more specifically, the output capacitor 21 is coupled between a first output node 13 and a second output node 14 of the output 13, 14 of the converter stage 1. The second output capacitor is configured to be activated or deactivated. That is, the second output capacitor 22 is configured to be connected in parallel with the first output capacitor 21 or to be disconnected from the first output capacitor 21. For connecting the second output capacitor 22 in parallel with the first output capacitor 21 or for disconnecting the second output capacitor 22 from the first output capacitor 21, the output circuit 2 includes a first electronic switch 23. This first electronic switch 23 is connected in series with the second output capacitor 22, wherein the series circuit including the second output capacitor 22 and the first electronic switch 23 is connected in parallel with the first output capacitor 21. The circuit with the first output capacitor 21, the second output capacitor 22 and the first electronic switch 23 is also referred to as output capacitor circuit 20 in the following.

Referring to FIG. 1, the output circuit 2 further includes an output 25, 26 that is configured to provide a supply voltage Vbus to a load (illustrated in dashed lines in FIG. 1). A second electronic switch 24 is connected between the output capacitor circuit 20 and the output 25, 26. This second electronic switch 24 can be switched on (activated) or switched off (deactivated). When the second electronic switch 24 is switched on, the output capacitor circuit 20 is connected to the output 25, 26, so that the supply voltage Vbus available at the output 25, 26 essentially equals the output voltage Vout provided by the converter stage 1 (a voltage drop across the second electronic switch 24 is negligible). When the second electronic switch 24 is switched off, the output capacitor circuit 20 is disconnected from the output 25, 26. In this case, the supply voltage Vbus is defined by the load and a power transfer from the converter stage 1 to the load is interrupted.

Just for the purpose of illustration, in the example shown in FIG. 1, the second electronic switch 24 is connected between the first output node 13 of the converter stage 1 and the a first output node 25 of the output circuit 2. This, however, is only an example. According to another example (not shown), the second electronic switch 24 is connected between the second output node 14 of the converter stage 1 and the second output node 26 of the output circuit 2. In each case, a power transfer between the converter stage 1 and the output 25, 26 of the output circuit 2 is interrupted when the second electronic switch 24 is switched off.

Any kind of conventional electronic switch may be used to implement the first and second electronic switch 23, 24. Examples of a conventional electronic switch include, but are not restricted to, a MOSFET (Metal Oxide Semiconductor Field-Effect Transistor), an IGBT (Insulated Gate Bipolar Transistors), a HEMT (High Electron Mobility Transistor), a JFET (Junction Field-Effect Transistor), or combinations thereof. According to one example, the second electronic switch 24 is a bidirectional blocking electronic switch that includes two MOSFETs in a series configuration such that body diodes of the two MOSFETs are in a back-to-back configuration.

In the power supply shown in FIG. 1, the input 11, 12 of the converter stage 1 forms an input of the power supply and the output 25, 26 of the output circuit 2 forms an output of the power supply.

Optionally, the output circuit 2 further includes a third output capacitor 28 that is connected between the output nodes 25, 26. A capacitance of this capacitor may be much smaller than a capacitance of the first output capacitor 21. According to one example, the capacitance of the third output capacitor 28 is less than 10%, less than 5%, or less than 2% of the capacitance of the first output capacitor 21. The capacitance of the first output capacitor is between 30 microfarads (µF) and 100 microfarads, for example.

According to one example, the capacitance of the second output capacitor 21 is higher than the capacitance of the first output capacitor 21. According to one example, the capacitance of the second output capacitor 22 is at least 2 times, at least 3 times, at least 5 times, or at least 10 times the capacitance of the first output capacitor 21. The capacitance of the second output capacitor 22 is selected from between 100 microfarads (µF) and 1000 microfarads (µF) (=1 millifarad), for example.

The power supply shown in FIG. 1 may be part of a so-called USB (Universal Serial Bus) PD (Power Delivery) device. In addition to the power supply, which receives a direct input voltage Vin, the USB PD device may include a PFC converter (not shown) that receives an alternating grid voltage and provides the DC input voltage Vin.

Referring to FIG. 1, the power supply further includes a control circuit (controller) 3. The controller 3 receives the output voltage Vout and is configured to generate a feedback signal FB based on the output voltage Vout. The feedback signal FB is received by the converter stage 1. According to one example, the converter stage 1 includes a galvanic isolation between the input 11, 12 and the output 13, 14. In this example, the power supply includes a coupler 4 between the controller 3 and the converter stage 1, wherein the coupler 4 is configured to transmit the feedback signal FB from the controller 3 to the converter stage 1 via the galvanic isolation included in the converter stage 1. According to one example, the coupler 4 is an opto-coupler an inductive coupler, a capacitive coupler, or the like.

The controller 3 is configured to activate and deactivate the second output capacitor 22. That is, the controller 3 is configured to control operation of the first electronic switch 23 that either connects the second output capacitor 22 in parallel with the first output capacitor 21, or disconnects the second output capacitor 22 from the first output capacitor 21. For controlling operation of the first electronic switch 23, controller 3 is configured to generate a first drive signal Sdrv23 that is configured to switch on or off the first electronic switch 23. The controller 3 may also be configured to control operation of the second electronic switch 24 of the output circuit 2. That is, the controller 3 may be configured to provide a second drive signal Sdrv24 that is configured to switch on or off the second electronic switch 24. Operation of the controller 3 for controlling the first and second electronic switches 23, 24 is explained in detail herein further below.

According to one example, the power supply is configured to operate in a first operating mode, which is also referred to as normal operating mode in the following, or a second operating mode, which is also referred to as standby mode in the following. The power supply may operate in the normal operating mode when the load is connected to the output 25, 26 of the power supply, and may operate in the standby mode after an input voltage Vin is received by the power supply and the load has not yet been connected to the power supply or after the load has been disconnected from the power supply.

In the normal operating mode, controller 3 switches off the first electronic switch 23 and switches on the second electronic switch 24. Thus, in the normal operating mode, only the first output capacitor 21 contributes to an output capacitance of the power supply and the supply voltage Vbus received by the load essentially equals the output voltage Vout of the converter stage 1. Furthermore, in the normal operating mode, the power supply regulates the output voltage Vout and, therefore, the supply voltage Vbus received by the load, in such a way that the output voltage Vout essentially equals a predefined setpoint voltage. This is explained in detail herein further below. In the normal operating mode, the converter stage 1 supplies both, the load and the controller 3 with electrical power required to ensure a proper operation of the load and the controller 3. According to one example, the power consumption of the load is significantly higher than the power consumption of the controller 3. According to one example, the power consumption of the load is higher than 1 W and the power consumption of the controller 3 is lower than 1 W.

In the standby mode, controller 3 connects the second output capacitor 22 in parallel to the first output capacitor 21 by switching on the first electronic switch 23 and switches off the second electronic switch 24. Thus, in the standby mode, the first output capacitor 21 and the second output capacitor 22 contribute to the output capacitance of the power supply. The output capacitance in the standby mode is given by the parallel circuit of the first and second output capacitors 21, 22, so that the output capacitance in the standby mode is higher than in the normal operating mode. In the standby mode, only the controller 3 is supplied by the converter stage 1.

According to one example, operating the power supply in the standby mode includes operating the converter stage 1 in a burst mode. Operating the converter stage 1 in the burst mode includes alternatingly operating the converter stage 1 in burst-on periods and burst-off periods. Operating the converter stage 1 in the burst-on periods includes transferring power from the input 11, 12 to the output 13, 14 to charge the output capacitor circuit 20. Operating the converter stage 1 in the burst-off periods includes deactivating the converter stage 1 so that no power is transferred from the input 11, 12 to the output 13, 14. The power transferred by the converter stage 1 from the input 11, 12 to the output 13, 14 during the burst-on periods is higher than the power consumption of the controller 3 so that during the burst-on periods, the output voltage Vout increases. During the burst-off periods, in which no power is transferred from the input 11, 12 to the output 13, 14, the output voltage Vout decreases due to the power consumption of the controller 3.

Figure 2:
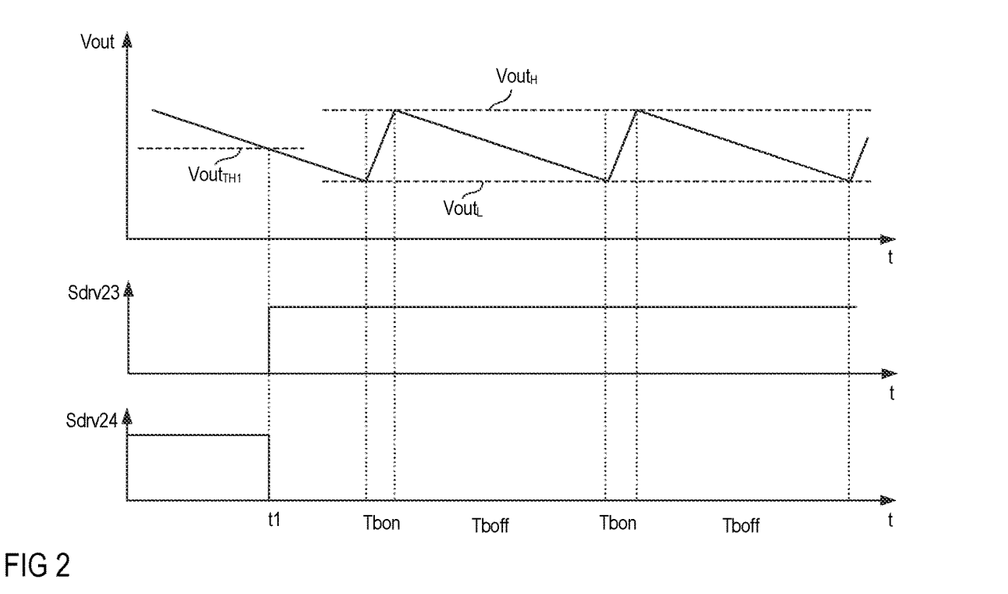
FIG. 2 shows signal diagrams that illustrate operating the power supply in the standby mode.

This is illustrated in FIG. 2 which shows a signal diagram of the output voltage Vout over the time when the converter stage 1 is in the burst mode. As can be seen from the FIG. 2, the output voltage oscillates between an upper voltage level $Vout_H$ and a lower voltage level $Vout_L$, wherein the voltage increases during burst-on periods Tbon and decreases during burst-off periods Tboff.

A difference between the upper voltage level $Vout_H$ and the lower voltage level $Vout_L$ is between 1V and 2V, for example. According to one example, the upper voltage level $Vout_H$ is between 4.5V and 5.5V and the lower voltage level is between 3V and 4V.

Operating the converter stage 1 in the burst-on periods, that is, transferring power from the input 11, 12 to the output 13, 14 is associated with losses. Increasing the output capacitance by connecting the second output capacitor 22 in parallel with the first output capacitor 21 helps to reduce these power losses. Increasing the output capacitance in the standby mode increases a duration of the burst-off periods Tboff, as compared to a scenario in which the second output capacitor 22 is omitted. Thus, the converter stage 1 is activated less often within a given time period. Operating the power supply in burst-on periods less frequently helps to reduce power losses, which will be explained in detail herein further below.

The dielectric strength of the second output capacitor 22 is adapted to the upper voltage level $Vout_H$ of the output voltage Vout in the burst mode. The "dielectric strength" is the maximum voltage a capacitor can withstand without being damaged. According to one example, the dielectric strength of the second output capacitor 22 is between 5V and 7V, in particular between 5.5V and 6.5V. According to one example, the second output capacitor 22 is a Tantalum (Ta) capacitor.

According to one example, in the normal operating mode, the output voltage is regulated to a voltage level that is selected from a range that includes voltage levels higher than the upper voltage level $Vout_H$ in the burst mode. The dielectric strength of the first output capacitor 21 is adapted this voltage range and is higher than the maximum output voltage that may occur in the normal operating mode. According to one example, the dielectric strength of the first output capacitor 21 is between 1.1 times and 1.5 times, in particular between 1.1 times and 1.3 times of the maximum output voltage Vout.

According to one example, the output voltage Vout, in the normal operating mode, may be selected from a voltage range of between 5V and 20V and the dielectric strength of the first output capacitor 21 is selected from between 22V and 30V, in particular from between 22V and 26V.

According to one example, the dielectric strength of the second output capacitor 22 is less than 50%, less than 35%, or even less than 20% of the dielectric strength of the first output capacitor 21.

Referring to the above, the second output capacitor 22 is activated in the standby mode. According to one example, the second output capacitor 22 is activated when the output voltage Vout falls below a predefined first voltage threshold $Vout_{TH1}$ for the first time after the beginning of the standby mode. This is illustrated in FIG. 2 which, in addition to the signal diagram of the output voltage Vout, shows signal diagrams of the drive signals Sdrv23, Sdrv24 of the first and second electronic switches 23, 24. Just for the purpose of illustration, high signal levels of the drive signals Sdrv23, Sdrv24 represent signal levels that switch on the respective electronic switch 23, 24, and low signal levels represent signal levels that switch off the respective electronic switch 24.

In FIG. 2, t1 denotes a time instance at which the output voltage Vout falls below the first voltage threshold $Vout_{TH1}$ for the first time after the beginning of the standby mode. At this time instance, the first electronic switch 23 switches on in order to activate the second output capacitor 22. The first voltage threshold $Vout_{TH1}$ may be selected in various ways. In each case, the first voltage threshold $Vout_{TH1}$ is lower than the dielectric strength of the second output capacitor 22.

(a) According to one example, the first voltage threshold $Vout_{TH1}$ is selected such that the output voltage Vout can reach the first voltage threshold $Vout_{TH1}$ only when the power supply is in the standby mode, which may be achieved by selecting the first voltage threshold $Vout_{TH1}$ from a range of between the lower voltage level $Vout_L$ and the upper voltage level $Vout_H$. In this case, a decision on whether to switch on the first electronic switch 23 may be based only on the output voltage Vout.

(b) According to another example, the first voltage threshold $Vout_{TH1}$ is selected such that the output voltage Vout can reach the first voltage threshold $Vout_{TH1}$ in the normal operating mode and in the standby mode. Thus, a decision on whether to switch on the first electronic switch 23 cannot only be based on the output voltage Vout, so that further information is required. This further information may include information on the load status, that is, whether or not a load is connected to the power supply. According to one example, the controller 3 is configured to detect whether or not the load is connected to the power supply and the controller 3 is configured to switch on the first electronic switch 23 when no load is connected and the output voltage falls below the first voltage threshold $Vout_{TH1}$.

Referring to FIG. 1, the power supply, in addition to the output nodes 25, 26, may include at least one communication port 27, wherein a communication channel can be established between the power supply and the load via this communication port 27. This communication port 27 may be used by the controller 3 to detect whether or not a load is connected.

Referring to FIG. 2, the second electronic switch 24 may be switched off at the first time instance t1, that is, when the first electronic switch 23 switches on. According to another example, the second electronic switch 24 is switched off as soon as the controller 3 detects that the load has been disconnected.

Figure 3:
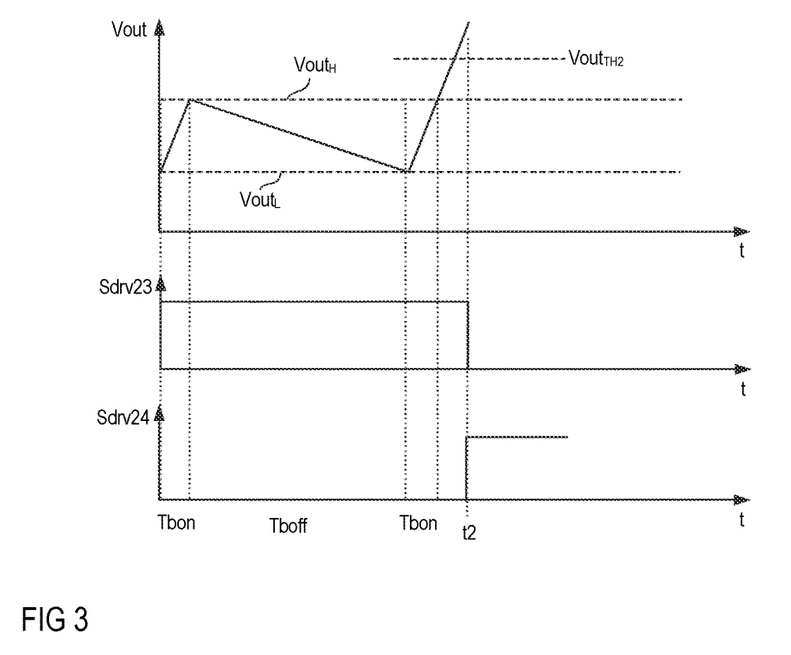
FIG. 3 shows signal diagrams that illustrate operating the power supply at the end of the standby mode.

The second output capacitor 22 is deactivated by switching off the first electronic switch 23 when the power supply changes from the standby mode to the normal operating mode. According to one example, illustrated in FIG. 3, the first electronic switch 23 is switched off when the output voltage Vout, reaches a second voltage threshold $Vout_{TH2}$ that is higher than the upper voltage level $Vout_H$ in the burst mode and lower than the dielectric strength of the second output capacitor 22.

According to another example, the first electronic switch 23 is switched off as soon as the controller 3 detects that a load has been connected to the power supply.

According to one example the second electronic switch 24 is switched on when the first electronic switch 23 is switched off. According to another example, the second electronic switch 24 is switched on when the output voltage Vout, in the normal operating mode, has reached the setpoint voltage.

Figure 4:
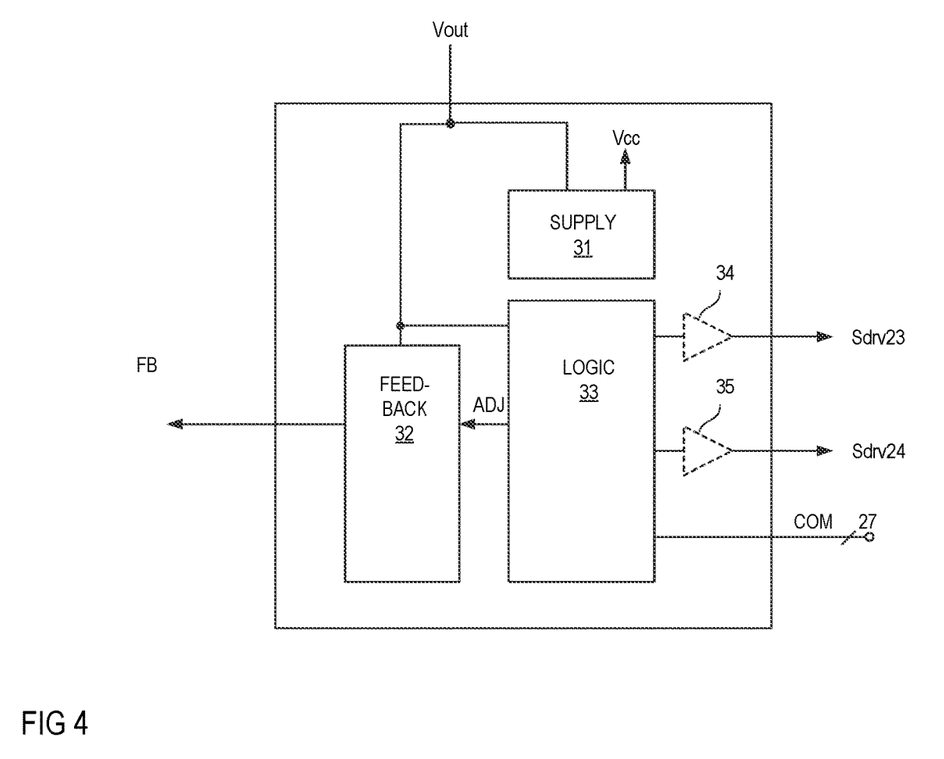
FIG. 4 shows a block diagram of the controller according to one example.

FIG. 4 shows a block diagram of the controller 3 according to one example. It should be noted that the block diagram shown in FIG. 4 illustrates the functionality of the controller 3 rather than its specific implementation. The controller 3 may include a digital circuit, such as a microcontroller, that executes software and analog devices, such as capacitive resistors, or the like, connected to the microcontroller. The individual function blocks shown in FIG. 2 may be implemented using only parts of the microcontroller or may be implemented using parts of the microcontroller and using analog devices.

Referring to FIG. 4, the controller 3 includes a supply circuit 31 that receives the output voltage Vout and is configured to generate a supply voltage Vcc for supplying the individual circuit blocks (functional blocks) of the controller 3. The controller 3 further includes a feedback circuit 32 that receives the output voltage Vout and is configured to generate the feedback signal FB based on the output voltage Vout. Furthermore, the controller 3 includes a logic circuit (control circuit) 33 that also receives the output voltage Vout and is configured to drive the first and second electronic switches 23, 24. Optionally, drive circuits 34, 35 (illustrated in dashed lines in FIG. 2) are coupled between the logic circuit 33 and the first and second electronic switches 23, 24.

Figure 5:
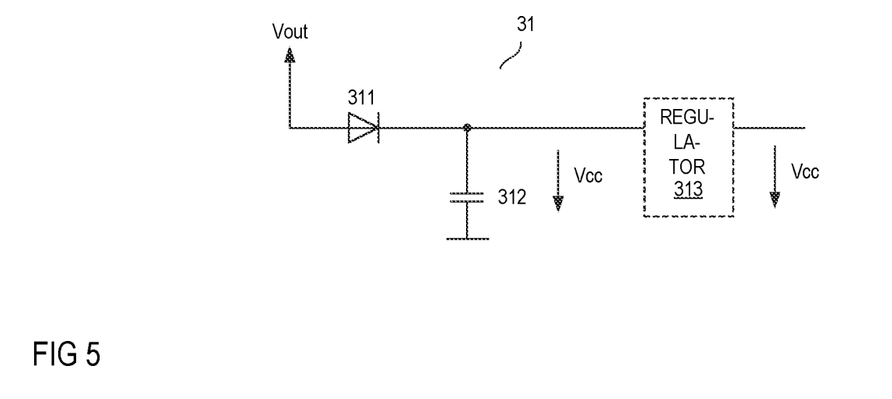
FIG. 5 shows one example of a supply circuit of the controller.

FIG. 5 shows one example of the supply circuit 31. The supply circuit according to this example includes a rectifier element 311 such as a diode and a capacitor 312 connected in series with the rectifier element 311. The series circuit including the rectifier element 311 and the capacitor 312 receives the output voltage Vout. The supply voltage Vcc of the controller 3 is a voltage across the capacitor 312. According to one example, the output voltage Vout provided by the converter stage 1 may vary within a certain voltage range. Thus, according to one example, the supply circuit 31 may include a voltage regulator 313 (illustrated in dashed lines in FIG. 3) configured to receive the voltage across the capacitor 312 and to generate a regulated supply voltage based Vcc on the voltage across the capacitor 312.

Figure 6:
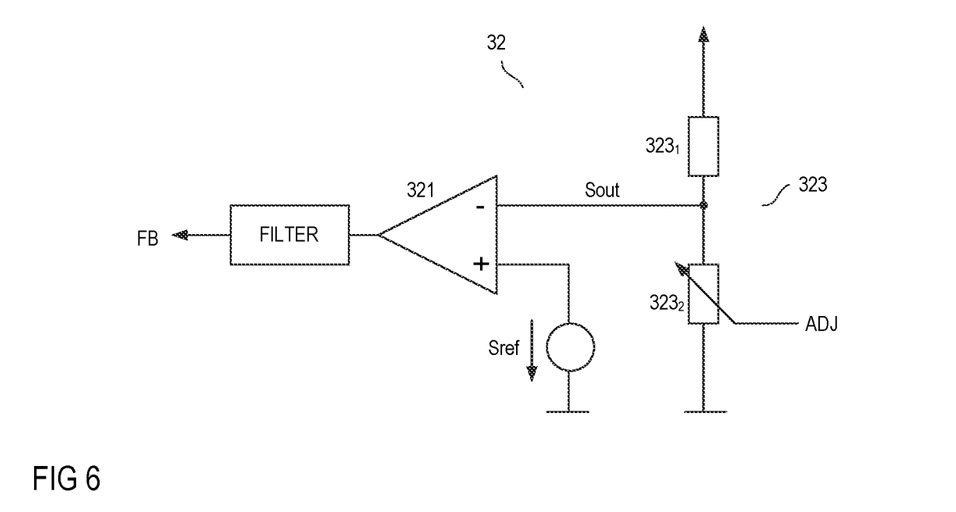
FIG. 6 shows one example of a feedback circuit of the controller.

FIG. 6 illustrates one example of the feedback circuit 32. This feedback circuit 32 includes an error amplifier 321 that receives a reference signal Sref from a reference signal source 322 and an output signal Sout, wherein the output signal Sout is dependent on the output voltage Vout. According to one example, the output signal Sout is proportional to the output voltage Vout and is generated by a resistive voltage divider 323 that includes a first resistor $323_1$ and a second resistor $323_2$ which are connected in series. The output voltage Vout is received by the series circuit including the first resistor $323_1$ and the second resistor $323_2$ of the voltage divider 323, and the output signal Sout is a voltage across the second resistor $323_2$. The reference signal source 322 is a voltage source according to one example, so that the reference signal Sref is a reference voltage (in the following, the reference signal Sref is also referred to as reference voltage). The error amplifier 321 provides an error signal Serr which is dependent on a difference between the reference signal Sref and the output signal Sout. According to one example, the error signal Serr is generated such that the error signal decreases when the output voltage Vout increases, and vice versa.

Referring to FIG. 6, the feedback circuit 32 further includes a filter 324 that receives the error signal Serr and provides the feedback signal FB based on the error signal Serr. According to one example, the filter 324 has a proportional-integrative (PI) characteristic or a proportional-integrative-derivative (PID) characteristic.

Referring to the above the power supply, in the normal operating mode, regulates the output voltage Vout and, therefore, the supply voltage Vbus received by the load in such a way that the output voltage Vout essentially equals a predefined setpoint voltage. According to one example, this setpoint voltage is defined by the reference voltage Sref and a proportionality factor between the output signal Sout and the output voltage Vout. In the normal operating mode, the feedback signal FB received by the power converter stage 1 essentially defines the power that is transferred from the input 11, 12 to the output 13, 14 of the converter stage 1, wherein this power is adjusted in such a way that the output voltage Vout essentially equals the desired setpoint voltage.

According to one example, the feedback signal FB is generated such that the power transferred from the input 11, 12 to the output 13, 14 increases when the feedback signal FB increases and decreases when the feedback signal FB decreases. In the normal operating mode, when the power supply is in a steady state, the feedback signal FB is generated such that the error signal Serr is essentially zero, that is, the output signal Sout equals the reference voltage Sref and the output voltage Vout is given by the reference voltage Sref multiplied with a proportionality factor between the output signal Sout and the output voltage Vout, wherein this proportionality factor is defined by the voltage divider 323.

According to one example, the power supply, in the normal operating mode, is configured to select the setpoint voltage from a predefined voltage range. According to one example, this voltage range includes voltages from between 5V and 20V. The controller 3 may receive the desired setpoint voltage via the communication channel COM from the load.

According to one example, the controller 3 is configured to (a) operate the power supply such that a default level of the output voltage Vout (and the supply voltage Vbus) is generated when an input voltage Vin is received at the input 11, 12 and the presence of the load has been detected, and (b) adjust the voltage level of the output voltage Vout to a desired voltage level communicated by the load via the communication channel COM. According to one example, the default level of the output voltage Vout is the minimum of the voltage range from which the level of the output voltage Vout can be selected.

The controller 3 may vary the setpoint voltage by varying the proportionality factor between the output signal Sout and the output voltage Vout. According to one example, at least one of the resistors $323_1$, $323_2$ of the voltage divider 323 is a variable resistor and adjusting the proportionality factor includes adjusting a resistance of the variable resistor. According to one example, the second resistor $323_2$ is a variable resistor, wherein the resistance of this resistor is adjusted by the logic circuit 33 that is in communication with the load. In this example, decreasing the resistance of this resistor $323_2$ decreases the proportionality factor between the output signal Sout and the output voltage Vout, which is equivalent to increasing the setpoint voltage.

Referring to the above, operating the converter stage 1 in the standby mode includes operating the converter stage 1 in the burst mode, which includes alternatingly operating the converter stage 1 in burst-on periods and burst-off periods. The power transferred by the converter stage 1 from the input 11, 12 to the output 13, 14 during the burst-on periods Tbon is higher than the power consumption of the controller 3 so that during the burst-on periods, the output voltage Vout increases. During the burst-off periods Tboff, in which no power is transferred from the input 11, 12 to the output 13, 14, the output voltage Vout decreases due to the power consumption of the controller 3. Thus, during the burst-on periods Tbon, the feedback signal FB decreases, and during the burst-off periods Tboff, the feedback signal FB increases. According to one example, in the burst mode, the converter stage 1 starts a burst-on period when the feedback signal FB reaches a first threshold Bon which is referred to as burst-on threshold in the following, and starts a burst-off period, when the feedback signal FB reaches a second threshold Boff, which is lower than the first threshold Bon and which is referred to as burst-off threshold in the following.

Figure 7:
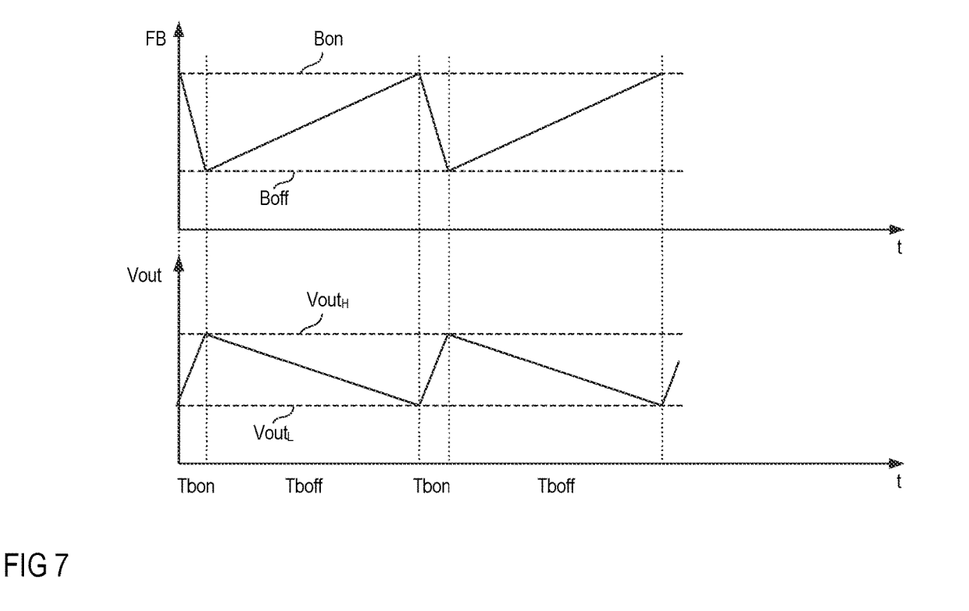
FIG. 7 shows signal diagrams that illustrate a feedback signal generated by the controller and an output voltage of the converter stage in a burst mode.

This is schematically illustrated in FIG. 7, which schematically illustrates a signal waveform of the feedback signal FB and the output voltage Vout in the burst mode. Referring to FIG. 7, and as discussed above, the output voltage Vout increases during the burst-on periods Tbon and decreases during the burst-off periods Tboff. The burst-off threshold Boff is associated with the lower output voltage level $Vout_L$ and the burst-on threshold Bon is associated with the upper output voltage level $Vout_H$.

Figure 8:
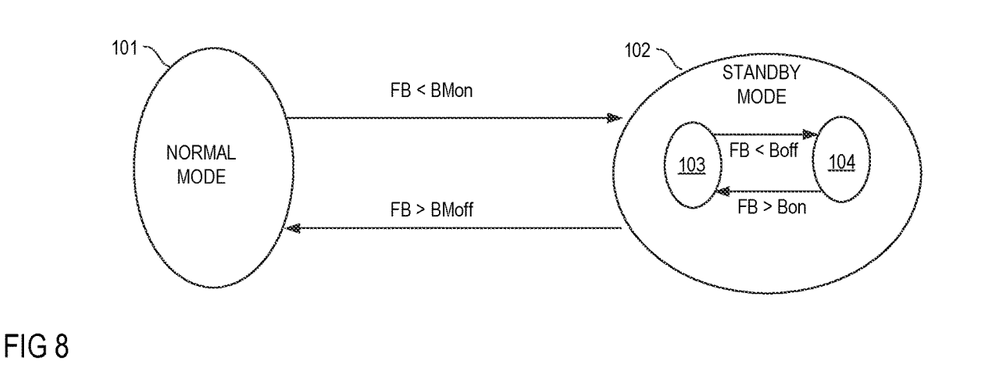
FIG. 8 shows a state diagram that illustrates operating the power supply in the normal operating mode or the standby mode.

FIG. 8 shows a state diagram that illustrates operating the power supply in the normal operating mode or the standby mode. State 101 in FIG. 8 represents a state in which the power supply operates in the normal operating mode, and state 102 represents a state in which the power supply operates in the standby mode. According to one example, the power supply changes from the normal operating mode 101 to the standby mode 102 when the feedback signal FB falls below a burst mode on-threshold BMon. According to one example, this burst mode on-threshold is lower than the burst-off threshold Boff explained with reference to FIG. 7. Within the standby mode 102, the power supply operates in a burst-on mode 103 in which power is transferred from the input 11, 12 to the output 13, 14 or in a burst-off mode 104 in which no power is transferred from the input 11, 12 to the output 13, 14. As explained with reference to FIG. 7, the power supply changes from the burst-on mode 103 to the burst-off mode 104 when the feedback signal FB falls below the burst-off threshold Boff, and changes from the burst-off mode 104 to the burst-on mode 103 when the feedback signal reaches the burst-on threshold Bon.

Referring to FIG. 8, the converter stage 1 leaves the burst mode, that is, changes from the burst mode 102 to the normal operating mode 101, when the feedback signal FB reaches a burst mode off-threshold BMoff, which is higher than the burst-on threshold Bon.

By operating the converter stage 1 in the normal operating mode or the standby mode dependent on the feedback signal FB, the converter stage 1 automatically changes from the normal operating mode to the standby mode, when the load is disconnected from the output 25, 26 and from the standby mode to the normal operating mode when a load is connected to the output 25, 26. When the converter stage 1 is in the normal operating mode and the load is disconnected, the output voltage Vout rapidly increases because the power transferred by the converter stage 1 from the input 11, 12 to the output 13, 14 is much higher than the power consumption of the controller 3, which after disconnecting the load is the only consumer connected to the output 13, 14 of the converter stage 1. This rapid increase of the output voltage Vout causes the feedback signal FB to fall below the burst mode on-threshold BMon, so that the converter stage 1 enters the burst mode. Operating the converter stage 1 in the burst mode starts with a burst-off period in which the output voltage Vout decreases from the voltage level the output voltage Vout has reached at the end of the normal operating mode to a voltage level that is associated with the burst-on level Bon of the feedback signal FB.

Figure 9:
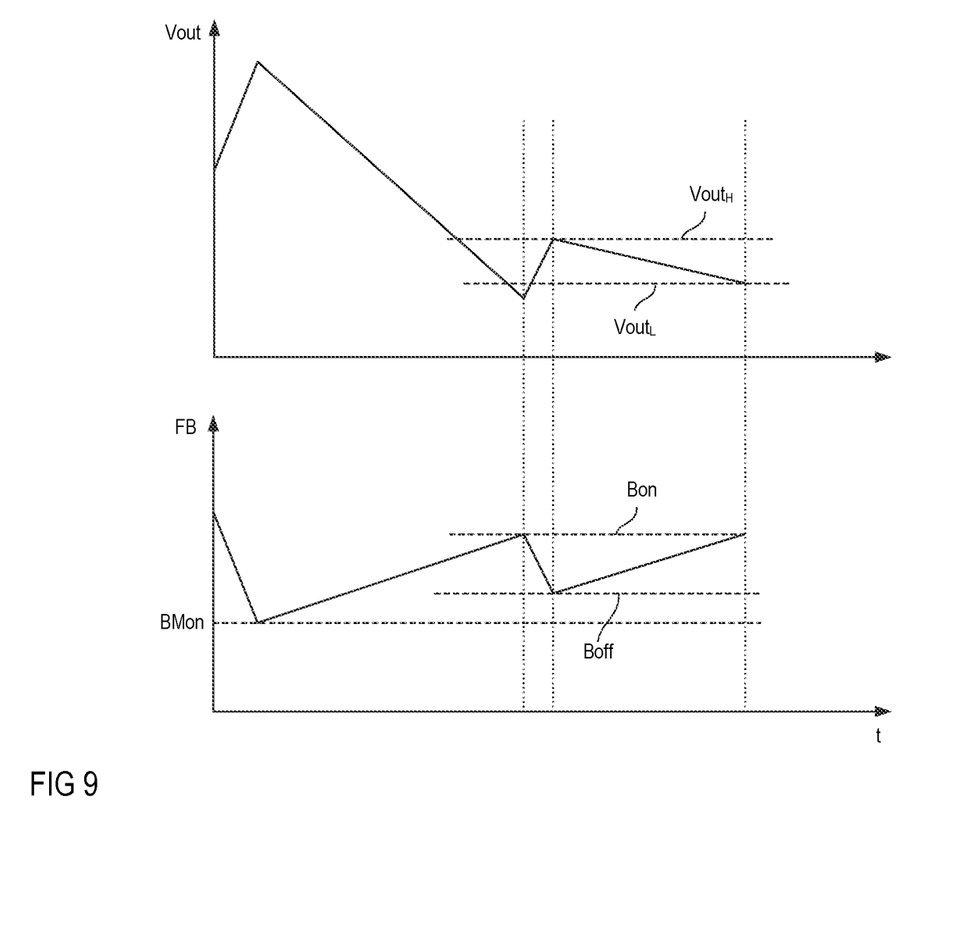
FIG. 9 shows signal diagrams that illustrate a transfer of the power supply from the normal operating mode to the standby mode.

This is illustrated in FIG. 9 which schematically illustrates the output voltage Vout and the feedback signal FB in a time period in which the power supply changes from the normal operating mode to the standby mode. As explained above, the increase of the output voltage Vout before the power supply enters the standby mode is associated with a decrease of the feedback signal FB to below the burst mode on-threshold BMon. According to one example, the controller 3 is configured to monitor the connection between the controller 3 and the load via the communication channel COM and is configured to detect that the load has been disconnected. According to one example, in response to detecting that the load has been disconnected, the controller changes 3 the proportionality factor between the output voltage Vout and the output signal Sout from a higher level used during the normal operating mode to a lower level used in the standby mode. This change of the proportionality factor accelerates a decrease of the feedback signal FB to below the burst mode on-threshold BMon and therefore a deactivation of the converter stage for a first burst-off period in the burst mode.

Figure 10:
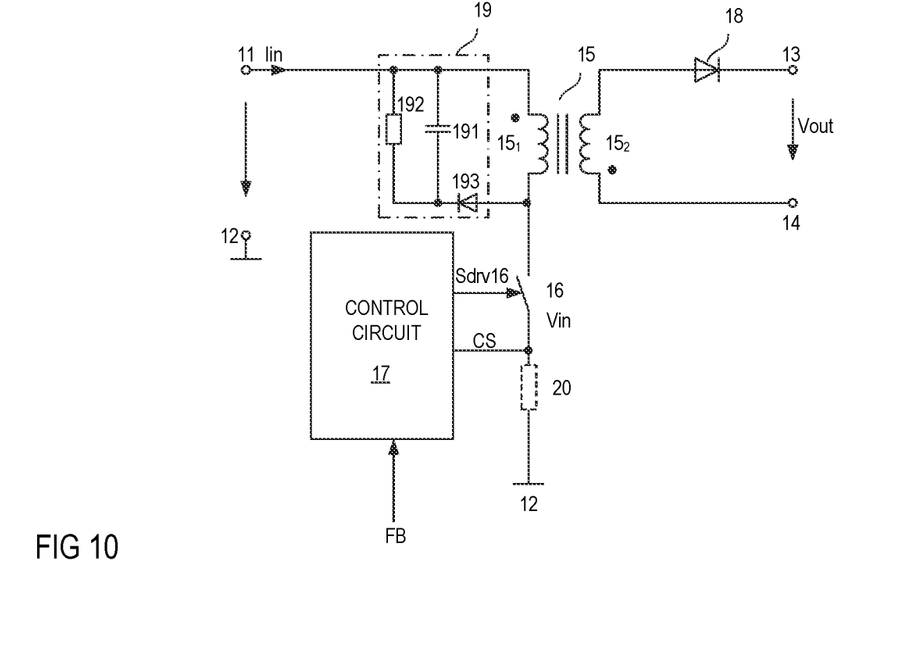
FIG. 10 shows one example of the converter stage in detail.

The converter stage 1 may be implemented in various ways. One example for implementing the converter stage 1 is illustrated in FIG. 10. In this example, the converter stage 1 includes a flyback converter topology. The topology of the flyback converter shown in FIG. 10 is commonly known, so that no detailed explanation is required in this regard. Referring to FIG. 10, the flyback converter includes a transformer 15 with a primary winding $15_1$ and a secondary winding $15_2$ and an electronic switch 16 connected in series with the primary winding $15_1$. A series circuit including the primary winding $15_1$ and the electronic switch 16 is connected between the input nodes 11, 12. The secondary winding 15₂ is coupled to the output nodes 13, 14 via a rectifier element 18. Just for the purpose of illustration, this rectifier element 18 is drawn as a diode in the example shown in FIG. 10. Of course, an active rectifier such as a synchronous rectifier (SR rectifier) may be used as well.

Referring to FIG. 10, a snubber circuit 19 may be coupled to the primary winding 15₁. The snubber circuit 19 may include a parallel circuit including a capacitor 191 and a resistor 192 and a diode 193 connected in series with the capacitor-resistor parallel circuit. The snubber circuit 19 may be connected in parallel with the primary winding 15₁.

In the burst mode of the flyback converter, the snubber capacitor is charged during the burst on-times and discharged during the burst-off times. Each charging and discharging the snubber capacitor 191 is associated with losses. Thus, reducing the frequency at which burst-on times occur, which can be achieved by implementing the second output capacitor 22, may help to reduce losses in the standby mode.

Referring to FIG. 10, the converter stage 1 further includes a control circuit 17 that receives the feedback signal FB and that is configured to drive the electronic switch 16 based on the feedback signal FB. The control circuit 17 generates a PWM (pulse-width modulated) drive signal Sdrv16 received by the electronic switch 16. According to one example, the control circuit 17, in the normal operating mode, generates the drive signal Sdrv16 such that a duty cycle of the drive signal is dependent on the feedback signal FB, wherein the duty cycle may increase as the feedback signal FB increases. This is commonly known, so that no further explanation is required in this regard.

In the burst mode, the drive signal Sdrv16 may be generated with a fixed duty cycle (such as 0.5) during the burst on-periods. During the burst-off periods, the electronic switch 16 is deactivated.

The converter stage 1 may operate in a current mode. In this operating mode, the controller 17, for operating the converter stage 1 in the normal operating mode, receives a current sense signal CS, which is proportional to a current through the electronic switch 16 and may be generated using a shunt resistor 20 connected in series with the switch 16. In this example, the controller 17 is configured to generate the drive signal Sdrv16 such that the electronic switch 16 switches on in accordance with a clock signal and switches off each time the current sense signal CS reaches a threshold that is proportional to the feedback signal FB. In this way, the duty cycle of the drive signal Sdrv16 is automatically adjusted to be dependent on the feedback signal FB.

Although the present disclosure is not so limited, the following numbered examples demonstrate one or more aspects of the disclosure.

Example 1—A control circuit configured to activate a second output capacitor connected in parallel with a first output capacitor of a power supply when the power supply is in a normal operating mode, and deactivate the second output capacitor when the power supply is in a standby mode.

Example 2—The control circuit according to example 1, wherein the control circuit is further configured to control operation of the power supply such that the power supply operates in the normal mode or the standby mode.

Example 3—The control circuit according to example 2, wherein the control circuit is configured, in the standby mode, to operate the power supply in a burst mode.

Example 4—A power supply, including: a converter stage having an input and an output; an output circuit connected to the output of the converter stage; and a control circuit according to any one of examples 1 to 4, wherein the output circuit includes a first output capacitor connected to the output of the converter stage, and a second output capacitor.

Example 5—The power supply of example 4, wherein a dielectric strength of the second output capacitor is less than 50%, less than 35%, or less than 20% of the dielectric strength of the first output capacitor.

Example 6—The power supply of example 4 or 5, wherein a capacitance of the second output capacitor is at least 2 times, at least 3 times, at least 5 times, or at least 10 times the capacitance of the first output capacitor.

Example 7—The power supply according to any one of the preceding examples, wherein the output circuit further includes: a first electronic switch connected in series with the second output capacitor and configured to be controlled by the control circuit to activate or deactivate the second output capacitor.

Example 8—The power supply according to any one of the preceding examples, wherein the output circuit further includes: a second electronic switch connected between the first output capacitor and the output and configured to be controlled by the control circuit.

Example 9—The power supply of any one of examples 4 to 8, wherein the control circuit is further configured to monitor an output voltage of the converter stage and to activate the second output capacitor dependent on the output voltage.

Example 10—The power supply of example 9, wherein the control circuit is further configured to detect the presence of a load connected to the output circuit and to activate the second output capacitor dependent on the presence of the load.

Example 11—The power supply of example 9, wherein the control circuit includes a communication port configured to allow the control circuit to communicate with a load, and wherein the control circuit is configured to detect the presence of the load by monitoring the communication port.

Example 12—The power supply any one of the preceding examples, wherein the control circuit is configured to receive an output voltage from the converter stage and generate an internal supply voltage based on the output voltage.

Example 13—The power supply any one of examples 8 to 12, wherein the control circuit is configured to switch on the second electronic switch in the normal operating mode and switch off the second electronic switch in the standby mode.

Example 14—A method, including: operating a power supply in a normal operating mode or a standby mode, wherein operating the power supply in the standby mode includes activating a second output capacitor connected in parallel with a first output capacitor of the power supply, and wherein operating the power supply in the normal operating mode includes deactivating the second output capacitor.

Example 15—The method of example 14, further including: detecting the presence of a load connected to the power supply, and operating the power supply in the normal mode when the presence of a load is detected and in the standby mode when the presence of a load is not detected.

The invention claimed is:

1. An apparatus comprising:
a control circuit operative to:
activate a second output capacitor connected in parallel with a first output capacitor of a power supply during a condition in which the power supply is in a standby mode;
deactivate the second output capacitor when the power supply is in a normal operating mode; and wherein a dielectric strength of the second output capacitor is less than 50% of a dielectric strength of the first output capacitor.

2. The apparatus according to claim 1, wherein the control circuit is further configured to control operation of the power supply such that the power supply operates in the normal mode or the standby mode.

3. The apparatus according to claim 2, wherein the control circuit is configured, in the standby mode, to operate the power supply in a burst mode.

4. The apparatus according to claim 1 further comprising:
a converter stage having an input and an output;
an output circuit connected to the output of the converter stage; and
wherein the output circuit comprises: i) the first output capacitor connected to the output of the converter stage, and ii) second output capacitor.

5. The apparatus according to claim 4, wherein the dielectric strength of the second output capacitor is less than 35% of the dielectric strength of the first output capacitor.

6. The apparatus according to claim 4, wherein a capacitance of the second output capacitor is at least 2 times a capacitance of the first output capacitor.

7. The apparatus according to claim 4, wherein the output circuit further comprises:
a first electronic switch connected in series with the second output capacitor, the first electronic switch controlled by the control circuit to activate or deactivate the second output capacitor.

8. The apparatus according to claim 4, wherein the output circuit further comprises:
a second electronic switch connected between the first output capacitor and the output, the second electronic switch controlled by the control circuit.

9. The apparatus according to claim 4, wherein the control circuit is further operative to monitor an output voltage of the converter stage and activate the second output capacitor depending on the output voltage.

10. The apparatus according to claim 4, wherein the control circuit is further operative to detect the presence of a load connected to the output circuit and activate the second output capacitor depending on a presence of the load.

11. The apparatus according to claim 4, wherein the control circuit comprises a communication port operative to allow the control circuit to communicate with a load, and
wherein the control circuit is operative to detect a presence of the load by monitoring the communication port.

12. The apparatus according to claim 4, wherein the control circuit is operative to receive an output voltage from the converter stage and generate an internal supply voltage based on the output voltage.

13. The apparatus according to claim 4, wherein the control circuit is operative to switch on the second electronic switch in the normal operating mode and switch off the second electronic switch in the standby mode.

14. A method comprising:
switching between operating a power supply in a normal operating mode and a standby mode, wherein operating the power supply in the standby mode comprises activating a second output capacitor connected in parallel with a first output capacitor of the power supply,
wherein operating the power supply in the normal operating mode comprises deactivating the second output capacitor; and
wherein a dielectric strength of the second output capacitor is less than 50% of a dielectric strength of the first output capacitor.

15. The method of claim 14 further comprising:
detecting presence of a load connected to the power supply, and operating the power supply in the normal mode when the presence of the load is detected and operating in the standby mode when the presence of the load is not detected.

16. An apparatus comprising:
a controller operative to:
monitor an output voltage outputted from a power converter, the output voltage of the power converter supplied to a capacitor bank, a capacitance of the capacitor bank being adjustable, the capacitor bank storing the output voltage received from the power converter; and
adjust the capacitance of the capacitor bank depending on usage of the stored output voltage in the capacitor bank in which: i) the capacitance of the capacitor bank is set to a first capacitance setting during a first condition in which the stored output voltage in the capacitor bank powers a load via activation of a first switch conveying the stored output voltage in the capacitor bank through the first switch to the load, and ii) the capacitance of the capacitor bank is set to a second capacitance setting during a second condition in which the output voltage stored in the capacitor bank is prevented from powering the load via deactivation of the first switch, the deactivation of the first switch preventing conveyance of the stored output voltage in the capacitor bank throw h the first switch to the load.

17. The apparatus as in claim 16, wherein the capacitor bank includes a first capacitor and a second capacitor; and
wherein the controller is further operative to: i) connect the first capacitor and the second capacitor in parallel to store the output voltage during the second condition, and ii) decouple the second capacitor from the first capacitor to store the output voltage in the first capacitor and not the second capacitor during the first condition.

18. The apparatus as in claim 16, wherein the second capacitance setting of the capacitor bank is greater than the first capacitance setting of the capacitor bank.

19. The apparatus as in claim 16, wherein the capacitor bank includes a first capacitor; and
wherein the controller is operative to adjust the capacitance of the capacitor bank via control of a second switch connecting a second capacitor in parallel with the first capacitor.

20. The apparatus as in claim 19, wherein the controller is operative to deactivate the second switch to an OFF-state to disconnect the second switch from being in parallel with the first switch during the first condition; and
wherein the controller is operative to activate the second switch to an ON-state to connect the second capacitor in parallel with the first capacitor during the second condition.

21. The apparatus as in claim 20, wherein the controller is operative to adjust the capacitance of the capacitor bank in response to detecting that a magnitude of the output voltage falls below a threshold level.

22. The apparatus as in claim 20, wherein the controller is operative to deactivate the first switch and activate the second switch in response to detecting that a magnitude of the output voltage falls below a threshold level.

23. The apparatus as in claim 20, wherein the controller is operative to deactivate the first switch and activate the second switch in response to detecting that a magnitude of the output voltage falls below a threshold level while the power converter is set to a standby mode.

24. The apparatus as in claim 19, wherein a dielectric strength of the second capacitor is less than 50% of a dielectric strength of the first capacitor.

\* \* \* \* \*

UNITED STATES PATENT AND TRADEMARK OFFICE
CERTIFICATE OF CORRECTION

| | | |
|---|---|---|
| PATENT NO. | : 11,901,802 B2 | Page 1 of 1 |
| APPLICATION NO. | : 17/577697 | |
| DATED | : February 13, 2024 | |
| INVENTOR(S) | : Sang Ho Jang | |

It is certified that error appears in the above-identified patent and that said Letters Patent is hereby corrected as shown below:

In the Claims

Column 13, Claim 4, Line 17, replace "second" with --the second--
Column 14, Claim 16, Line 29, replace "throw h" with --through--

Signed and Sealed this
Sixteenth Day of April, 2024

Katherine Kelly Vidal
*Director of the United States Patent and Trademark Office*